United States Patent [19]
Yoon et al.

[11] Patent Number: 5,973,786
[45] Date of Patent: Oct. 26, 1999

[54] METHOD FOR ABSOLUTELY MEASURING THE DIFFRACTION GRATING SPACING AND APPARATUS THEREOF

[75] Inventors: Tai-Hyun Yoon; Cheon-Il Eom; Myung-Sai Chung, all of Daejeon-Si, Rep. of Korea

[73] Assignee: Korea Research Institute of Standards and Science, Daejeon-Si, Rep. of Korea

[21] Appl. No.: 09/003,825

[22] Filed: Jan. 7, 1998

[30]     Foreign Application Priority Data

Apr. 4, 1997 [KR]  Rep. of Korea ...................... 97-12550

[51] Int. Cl.⁶ ...................................................... G01B 9/02
[52] U.S. Cl. .......................................... 356/354; 356/356
[58] Field of Search ...................................... 356/354, 356

[56]         References Cited

PUBLICATIONS

Diffractometric Methods for Absolute Measurement of Diffraction–Grating Spacings (Jan. 15, 1999, vol. 24, No. 2, Optics Letters).

*Primary Examiner*—Robert H. Kim
*Assistant Examiner*—Andrew Lee
*Attorney, Agent, or Firm*—Nikaido, Marmelstein, Murray & Oram LLP

[57]         ABSTRACT

A method of absolutely measuring the diffraction grating spacing and apparatus thereof, which solves the disadvantages of conventional techniques for measuring the diffraction grating spacing, and provides a method utilizing a new laser diffractometer capable of transferring the meter standard to the nanometer region. The invention comprises a first method which utilizes a wavelength stable laser for generating a stable laser beam of wavelength $\lambda$, 0th and 1st order diffracted beams diffracted at the diffraction grating, and a precision rotary encoder; and a second method utilizing two wave lengths $\lambda_1$, $\lambda_2$ of the wavelength stable laser, 0th and 1st order diffracted beams, and a precision rotary encoder.

2 Claims, 2 Drawing Sheets

METHOD FOR ABSOLUTELY MEASURING THE DIFFRACTION GRATING SPACING AND APPARATUS THEREOF

BACKGROUND OF THE INVENTION

The present invention relates to a method and apparatus for absolutely measuring a diffraction grating spacing, and more particularly to a first method and apparatus which uses a wavelength stable laser of wavelength λ, 0th and 1st order diffracted beams and a precision rotary encoder, as well as a second method and apparatus which uses two wave lengths $\lambda_1$, and $\lambda_2$, 0th and 1st order diffracted beams and a precision rotary encoder.

In general, there are two conventional techniques for measuring a diffraction grating spacing. The first uses an ordinary laser diffractometer and the second uses a laser interference diffractometer.

1) The method using an ordinary laser diffractometer measures an angle of the diffracted beam whereby the spacing of the diffraction grating is determined by utilizing a diffraction grating equation (1), set out below.

The laser diffractometer is simple in structure, but the measurement error depends on an angle measurement between the incident and diffracted beams. Therefore, in order to obtain a higher measurement resolution capacity, very large experimental equipment is required.

The ordinary laser diffractometer is used mainly for a linewidth measurement of the diffraction grating, or for measuring fine patterns by measuring also the intensity distribution of diffracted beams.

2) The laser interference diffractometer method uses a stable laser with two wavelengths or three wavelengths, which was developed for precisely measuring the diffraction grating spacing by using a standard diffraction grating and a Michelson interferometer.

This method relies upon the fact that spacings of interference patterns of different diffraction orders having mutually different wavelengths are different.

However, as with the conventional ordinary laser diffractometer described above, the length of the measurement arm should be made larger in proportion to the experimental angular resolution. Because there is an eccentricity problem between the diffraction grating and the rotating body, the uncertainty of measurement is decreased when an apparatus of ordinary laboratory size is used.

As with the conventional laser interference diffractometer described above, a stable laser having two or three wavelengths is used along with a Littrow type mounted diffraction grating in one arm of the interferometer in order to measure the diffraction grating spacing. Even though this method can increase the resolution over that of the ordinary laser interferometer, when two wavelengths are used, a measured standard diffraction grating should be used in a reference arm of the interferometer, so that there is a problem that uncertainties in the length standard are indirectly transferred to the measurement.

When three wavelengths are used, the standard diffraction grating may not be used and, because three wavelengths are required, the device becomes complicated.

In the laser interference diffractometer, the interference pattern is measured using a microscope, so that there is a problem of introducing an error into the measurement from the microscope.

OBJECT AND SUMMARY OF THE INVENTION

Therefore, an object of the present invention is to provide a method utilizing a new laser diffractometer, which overcomes the disadvantages of conventional techniques for measuring the diffraction grating spacing, and is directly traceable to the meter standard to the sub-micrometer region.

The object of the present invention is accomplished by providing new methods for absolutely measuring the diffraction grating spacing. In the first method, the diffraction angle between the 0th and 1st order diffracted beams is precisely measured using a precision rotary encoder. The beam is diffracted from a single Littman mounted standard grating. The second method uses two diffraction gratings. The angle between the 0th and 1st order diffracted beams is precisely measured using two wavelength standards and a rotary encoder. The diffraction grating is Littman mounted. The laser beam is made to pass the same optical path 4 times in order to increase the angular resolution of the methods.

Another object of the present invention is to provide a laser diffractometer which overcomes the advantages of the conventional techniques for measuring the diffraction grating spacing, and can directly transfer the length standard down to the sub-micrometer region.

DETAILED DESCRIPTION OF THE INVENTION

Hereinafter, the present invention will be described in detail with reference to the accompanying drawings.
Method 1

Figure 1:
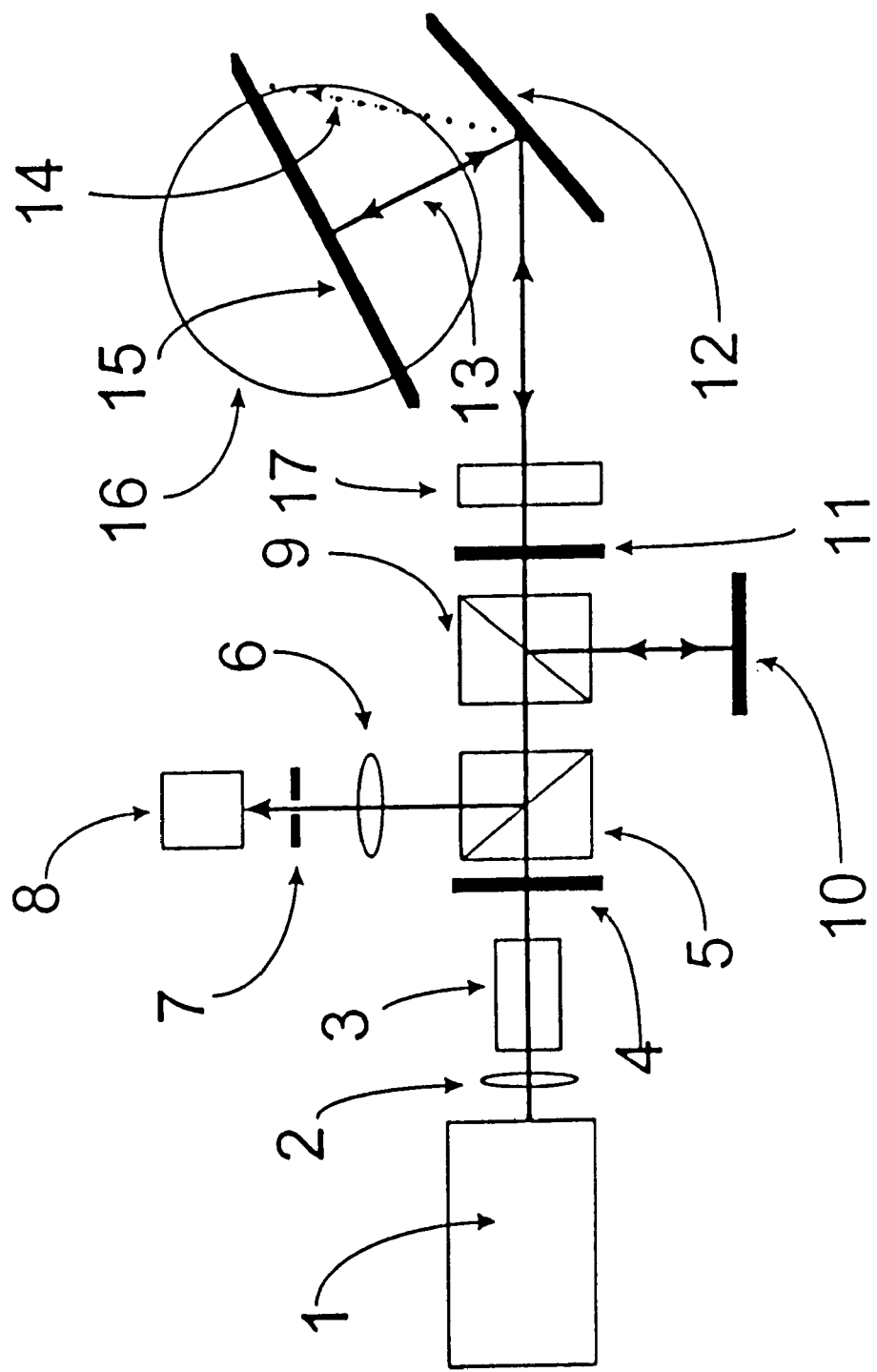
FIG. 1 is a schematic view of an apparatus for absolutely measuring the diffraction grating spacing of the present invention.

The first method of the present invention is a method utilizing one wavelength standard λ, 0th order diffracted beam 14, 1st order diffracted beam 13 and a precision rotary encoder 16. In FIG. 1, a laser beam of wavelength λ from wavelength stable laser 1, which is collimated by a collimating lens 2 and then passes through an optical isolator 3 is shown.

First, the polarization of the laser beam is rotated as much as 45 degrees so as to pass a polarization beam splitter 9 by utilizing a halfwave plate 4.

Next, the laser beam passes through a quaterwave plate 11 and is changed to a circular polarization. The beam is then expanded 10 times at a beam expander 17 and is then incident upon a diffraction grating 12.

Figure 2:
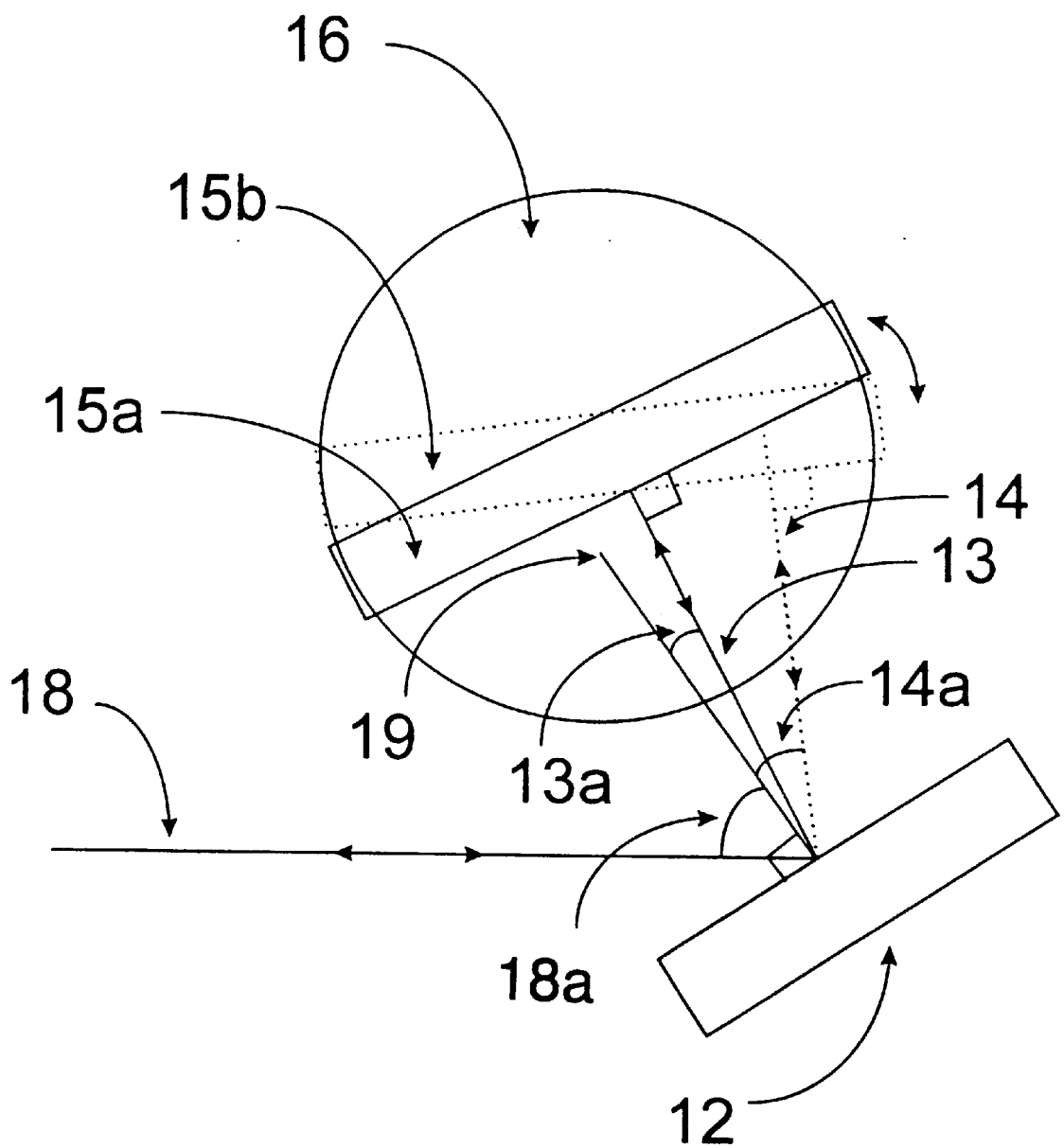
FIG. 2 is a schematic view showing an autocollimation by using a retro-mirror mounted on a precision rotary encoder and the Littman mounted diffraction grating.

The laser beam is then diffracted by satisfying the following diffraction equation in response to a spacing D of the diffraction grating 12 and the laser wavelength λ as shown in FIG. 2.

$$\sin \alpha \pm \sin \beta_m = m\lambda, \qquad (1)$$

m=0, 1, 2, ...

In equation (1), $\alpha$ and $\beta_m$ represent an incident angle and diffracted angle, respectively. As shown in FIG. 2, the incident angle $\alpha$ is measured between line 18 and the normal to the diffraction grating, line 19. The diffracted angle is also measured from the normal to the grating, line 19. The +symbol should be used when the mth order beam is located at the left side of the normal line 19 of the diffraction grating, and the −symbol should be used when it is located at the right side. Hereinafter in this invention, this sign convention is continuously used.

Since the 1st order diffracted beam is used in the first and second methods, it can be applied only when satisfying D>λ/2, which is the condition for producing the 1st order diffracted beam.

In equation (1), from the equation for the 0th order diffracted beam and the 1st order diffracted beam, the equation for the diffraction spacing D can be expressed as expression (2) by utilizing an angle difference $\phi=\beta_0-\beta_1$ between an angle $\beta_0$ of a 0th order diffracted beam with incident angle α and a diffracted angle $\beta_1$ of a 1st order diffracted beam.

$$D = \frac{\lambda}{\sin\phi\cos\alpha \pm (1-\cos\phi)\sin\alpha} \quad (2)$$

The diffraction grating spacing D is expressed by the wave length λ of the stable laser, diffracted angle difference φ between two diffracted beams, and the incident angle α, as shown in equation (2).

In general, since the wavelength can be determined with an uncertainty of better than $(1\times10^{-7})\times\lambda$, the uncertainty in the wavelength does not contribute to the uncertainties in D for both methods.

Accordingly, only errors produced upon measuring the incident angle λ and the diffraction angle difference φ of two diffracted beams remain.

Therefore in this invention, in order to precisely measure the incident angle α and the diffraction angle difference φ between the two diffracted beams, a precision rotary encoder 16 as shown in FIG. 1 is utilized. The diffraction grating 12 uses a Littman mount and the laser beam travels 4 times by utilizing a retro-mirror 15.

That is, in order to increase the resolution of the angle measurement of the diffracted beam, the laser beam reflected at the retro-mirror 15 passes the quaterwave plate 11, is reflected at the polarization beam splitter 9, is incident again on the diffraction grating by the mirror 10, and becomes diffracted again according to the equation (1).

Then, the secondly diffracted beam is reflected again by the retro-mirror 15 and then changed to a vertical polarization by the quaterwave plate 11, is reflected at the beam splitter 5, passes the focusing lens 6 and the pin hole 7, and is detected at the optical detector 8.

Since the resolution of the precision rotary encoder is about $10^{-4}$ degrees ($1.7\times10^{-6}$ rad), when an optical length from the grating 12 to the optical detector is L, if a focal length of the focusing lens 6 and size of the pin hole 7 are adjusted so as to satisfy a condition of $2\times10^{-6}$L, the angle can be measured to an angular resolution of $2\times10^{-6}$.

In addition, in order to measure the incident angle α to a resolution of $2\times10^{-6}$, the incident angle 18a is adjusted to a value different from the initial value, and the difference of diffraction angle 14a for the 0th order beam and diffraction angle 13a for the 1st order beam with respect to the incident angle is measured by utilizing the precision rotary encoder.

That is, assuming two incident angles $\alpha_1$, and $\alpha_2$, $$\alpha_2 = \alpha_1 + \Delta\alpha \quad (3)$$

Wherein Δα is a difference of incident angles measured by the precision rotary encoder.

In FIG. 2, when the incident angles 18a are $\alpha_1$ and $\alpha_2$, assuming that the angles in which the retro-mirror 15a against the 1st order diffracted beam and the retro-mirror 15b against the 0th order beam make are respectively $\phi_1$ and $\phi_2$, the diffraction grating 12 spacing D can be expressed as follows by utilizing the expressions (2) and (3) and by utilizing only the values Δα, $\phi_1$ and $\phi_2$ measured by resolution of $2\times10^{-6}$ at experiment. That is, $$D = \frac{\lambda}{\sin\phi_1\cos\alpha_1 \pm (1-\cos\phi_1)\sin\alpha_1} \quad (4)$$

$$\cos\alpha_1 = \frac{\sin\phi_2\sin\Delta\alpha \pm \cos\phi_2 - \cos\phi_1}{\sqrt{((\sin\phi_1 - \sin\phi_2\cos\Delta\alpha \pm (1-\cos\phi_2))^2 + (\sin\phi_2\sin\Delta\alpha \pm \cos\phi_2 - \cos\phi_1))^2}} \quad (5)$$

$$\sin\alpha_1 = \sqrt{(1-\cos\alpha_1^2)} \quad (6)$$

Accordingly, in this invention, as will be understood in expressions (4), (5) and (6), the spacing D of the diffraction grating can be absolutely measured by measuring Δα, $\phi_1$ and $\phi_2$ to a resolution of better than $2\times10^{-6}$ by utilizing the wavelength standard 1 of wavelength λ and the precision rotary encoder 16.

Method 2

Method 2 uses two wave lengths $\lambda_1$ and $\lambda_2$ of stable laser 1, 0th order diffracted beam 14, 1st order diffracted beam 13 and the precision rotary encoder 16.

Accordingly, since two wavelengths are used, the expressions of the diffraction grating 12 spacing are expressed differently from the expressions (2), (4), (5), (6), and it is not necessary to rotate the grating in order to change the incident angle α.

Assuming that the wave length difference of two wavelengths is $\Delta\lambda(=\lambda_2-\lambda_1>0)$, the 1st order diffraction angles of the wave lengths $\lambda_1$ and $\lambda_2$ are $\beta_{\lambda1}$ and $\beta_{\lambda2}$ respectively, and their difference ⊖, the diffraction grating spacing D is expressed as follows in method 2.

$$D = \frac{\pm\Delta\lambda}{\sin\theta\cos\beta_{\lambda1} \pm (1-\cos\theta)\sin\beta_{\lambda1}} \quad (7)$$

Since in method 2 the wavelengths of wavelength standard 1 and their difference are easily measured with an uncertainty of only one part in $10^7$, by utilizing a precision wavemeter, the absolute measurement of D is possible with a resolution and uncertainty equivalent to that of method 1.

It should be noted that two different signs are possible according to the position of each wavelength of the 1st order diffracted beams 13 in the expression (7).

As in the method 1, in order to measure the diffraction angle $\beta_{\lambda1}$ at the wave length $\lambda_1$ to a resolution of $(2\times10^{-6})\times\lambda_1$, the angle difference between 1 st order diffracted beams at two wavelengths i.e., $\beta_{\lambda1}$ and $\beta_{\lambda1}'$, are measured.

Assuming that the difference of these two angles is Δβ, it can be written as $$\beta_{\lambda 1}=\beta_{\lambda 1}'+\Delta\beta \qquad (8)$$

And if the angle differences between the 0th order and the 1st order diffracted beams at two wavelengths as measured by the precision rotary encoder 16 are $\ominus_1$ and $\ominus_2$ respectively, the diffraction grating spacing D is expressed as follows.

$$D = \frac{\pm\Delta\lambda}{\sin\theta_1\cos\beta_{\lambda 1} \pm (1-\cos\theta_1)\sin\beta_{\lambda 1}} \qquad (9)$$

Here $$\cos\beta_{\lambda 1} = \frac{(\sin\theta_2\sin\Delta\beta \pm \cos\theta_2 - \cos\theta_1)}{\sqrt{(\sin\theta_1 - \sin\theta_2\cos\Delta\beta \pm (1-\cos\theta_2))^2 + (\sin\theta_2\sin\Delta\beta \pm (\cos\theta_2 - \cos\theta_1))^2}} \qquad (10)$$

$$\sin\beta_{\lambda 1} = \sqrt{(1-\cos\beta_{\lambda 1}^2)} \qquad (11)$$

Accordingly, the spacing of diffraction grating 12 can be absolutely measured to a resolution identical to that of method 1 by measuring the difference $\Delta\beta$ of diffraction angle 13a for 1st order diffracted beams, and the diffraction angle differences $\ominus_1$ and $\ominus_2$ for 0th order and 1st order diffracted beams at two wavelengths.

Hereinafter, the embodiments of the present invention will be described.

Embodiment

The validity of the method and apparatus of the present invention is verified by absolutely measuring the diffraction grating spacing of commercial diffraction grating (2160 g/mm; Milton Roy, 35-53-04-040) by utilizing method 1 of the present invention.

The wavelength stable laser 1 used for the experiment was an LD-pumped 532 nm Nd:YAG laser in which the wave length stability is better than $1\times10^{-8}$.

The wavelength of the laser at room temperature was $\lambda=532.3390$ nm, as measured by a precision wavemeter.

The precision rotary encoder was model VRZ480 of Heiden-Hain Co. having an angular resolution of $1.7\times10^{-6}$ rad(1/10000 degrees).

The optical distance L from the diffraction grating 12 to the detector was approximately 10m.

In order to obtain an angular resolution of $2\times10^{-6}$, the beam size at the pin hole 7 was focused to less than about 100 μm.

As a result of the measurement, the spacing D of the diffraction of grating 12 was measured to be D=463.16 nm and one standard deviation was measured to be 0.24 nm, thereby verifying the method and apparatus of the present invention.

The invention described above has the advantage that the measurement is possible via two methods without changing the experimental apparatus.

In the two methods of the present invention, the diffraction grating uses a Littman mount and the laser beam passes the same optical path four (4) times, so that the conventional problem of having to use a large rotating arm is solved. In addition, the method and apparatus is capable of absolutely measuring the diffraction grating spacing to a higher angular resolution than any other small experimental device.

In particular, the incident angle is measured by selecting two different methods so that an error in incident angle measurement is completely eliminated. Furthermore, since the measurement error depends on only the angular measuring resolution of the precision rotary encoder, there exists the possibility that the resolution can be further increased in the future.

Accordingly, since the two methods for the absolute measurement of the diffraction grating spacing solve the disadvantages of earlier diffraction grating spacing measuring methods in the sub-micrometer range by directly transferring a length standard to the grating spacing D, it is expected to greatly influence 1) the manufacture of standard length reference materials such as line standard material in the nanometric region, 2) the precision measurement of periodic structural line spacings which are engraved on a video recording medium, such as a CD, and 3) the manufacture of standard diffraction gratings capable of being directly traced to a length standard for super-precision measuring equipment used in the nanometric region, such as electronic microscopes (SEM, TEM), optical microscopes, optical near field microscopes and atomic force microscopes.

We claim:

1. A method for measuring a diffraction grating spacing of a diffraction grating using a 0th and 1st order laser beam of wavelength $\lambda$ diffracted from said diffraction grating, and using a precision rotary encoder to precisely determine the diffraction angle comprising the steps of:

measuring a first incident angle $\alpha_1$ of said laser beam;

measuring a second incident angle $\alpha_2$ of said laser beam;

measuring an angle $\beta_0$ between a 0th order diffracted beam and a line normal to said diffraction grating;

measuring an angle $\beta_1$ between a 1st order diffracted beam and a line normal to said diffraction grating;

determining said diffraction grating spacing D wherein D is determined according to $$D = \frac{\lambda}{\sin\phi_1\cos\alpha_1 \pm (1-\cos\phi_1)\sin\alpha_1}$$

$\phi_1=\beta_0-\beta_1$ when said laser beam is incident at angle $\alpha_1$
$\phi_2=\beta_0-\beta_1$ when said laser beam is incident at angle $\alpha_2$ $$\cos\alpha_1 = \frac{(\sin\phi_2\sin\Delta\alpha \pm \cos\phi_2 - \cos\phi_1)}{\sqrt{\begin{array}{l}(\sin\phi_1 - \sin\phi_2\cos\Delta\alpha \pm (1-\cos\phi_2))^2 + \\ (\sin\phi_2\sin\Delta\alpha \pm \cos\phi_2 - \cos\phi_1)^2\end{array}}}$$

$\sin\alpha_1 = \sqrt{(1-\cos\alpha_1^2)}$,
and wherein $\Delta\alpha = \alpha_2 - \alpha_1$.

2. A method for measuring a diffraction grating spacing of a diffraction grating using 0th and 1st order laser beams of wavelength $\lambda_1$ and $\lambda_2$ diffracted from said diffraction grating, and using a precision rotary encoder to precisely determine the diffraction angle comprising the steps of:

measuring an angle $\beta_{\lambda 1}'$ of a laser beam of wavelength $\lambda_1'$ between a 1st order diffracted beam and a line normal to said diffraction grating;

measuring an angle $\beta_{\lambda 1}^{0}$ of a laser beam of wavelength $\lambda_1$ between a 0th order diffracted beam and a line normal to said diffraction grating;

measuring an angle $\beta_{\lambda 2}^{0}$ of a laser beam of wavelength $\lambda_2$ between a 0th order diffracted beam and a line normal to said diffraction grating;

measuring an angle $\beta_{\lambda 1}^{1}$ of a laser beam of wavelength $\lambda_1$ between a 1st order diffracted beam and a line normal to said diffraction grating;

measuring an angle $\beta_{\lambda 2}^{1}$ of a laser beam of wavelength $\lambda_2$ between a 1st order diffracted beam and a line normal to said diffraction grating;

determining said diffraction grating spacing D wherein D is determined according to $$D = \frac{\pm \Delta \lambda}{\sin\theta_1 \cos\beta_{\lambda 1} \pm (1 - \cos\theta_1)\sin\beta_{\lambda 1}}$$

$$\cos\beta_{\lambda 1} = \frac{\sin\theta_2 \sin\Delta\beta \pm \cos\theta_2 - \cos\theta_1}{\sqrt{(\sin\theta_1 - \sin\theta_2 \cos\Delta\beta \pm (1 - \cos\theta_2))^2 + (\sin\theta_2 \sin\Delta\beta \pm (\cos\theta_2 - \cos\theta_1))^2}}$$

$$\sin\beta_{\lambda 1} = \sqrt{(1 - \cos^2\beta_{\lambda 1})}$$

and wherein
$\Theta_1 = \beta_{\lambda 1}^{0} - \beta_{\lambda 2}^{0}$,
$\Theta_2 = \beta_{\lambda 1}^{1} - \beta_{\lambda 2}^{1}$,
$\Delta\beta = \beta_{\lambda 1}^{1} - \beta_{\lambda 1}'$.

\* \* \* \* \*